United States Patent [19]

Keller

[11] 4,172,395

[45] Oct. 30, 1979

[54] METHOD OF MANUFACTURING A ROTARY ROCK BIT

[75] Inventor: Wilbur S. Keller, Arlington, Tex.

[73] Assignee: Dresser Industries, Inc., Dallas, Tex.

[21] Appl. No.: 931,230

[22] Filed: Aug. 7, 1978

[51] Int. Cl.² .......................... B21K 5/02; B21D 53/10
[52] U.S. Cl. ............................... 76/108 A; 75/208 R; 29/149.5 PM; 308/8.2; 308/237
[58] Field of Search ............ 76/108 A, 108 R, 101 R, 76/107 E; 308/8.2, 35, DIG. 8, 237, DIG. 5, 241; 29/149.5 PM, 149.5 R, 149.5 DP; 75/208 R; 428/564

[56] References Cited

U.S. PATENT DOCUMENTS

| 2,595,903 | 5/1952 | Swart | 308/8.2 |
|---|---|---|---|
| 2,733,968 | 2/1956 | Pelz, Jr. | 308/DIG. 8 |
| 3,206,264 | 9/1965 | Dalzell et al. | 308/DIG. 8 |
| 3,235,316 | 2/1966 | Whanger | 308/8.2 |
| 3,984,158 | 10/1976 | Sorensen | 308/8.2 |

FOREIGN PATENT DOCUMENTS 1498558 1/1978 United Kingdom ..................... 308/8.2

*Primary Examiner*—Robert L. Spruill
*Assistant Examiner*—Roscoe V. Parker
*Attorney, Agent, or Firm*—Eddie E. Scott

[57] ABSTRACT

A rolling cone earth boring bit is produced having a bearing surface that has been infiltrated to a controlled depth. A groove is machined in one of the bearing members. The bearing member is placed in a die and an alloy powder material is pressed into the groove recess thereby producing a porous matrix for the bearing element. The bearing element is sintered to provide a porosity within the range of 10% to 20%. An anti-galling material is infiltrated into said porous matrix bearing element. The porous matrix bearing element is hardened resulting in a high-strength bearing that will provide performance with high loads at low RPM or high RPM.

4 Claims, 2 Drawing Figures

METHOD OF MANUFACTURING A ROTARY ROCK BIT

TECHNICAL FIELD

The present invention relates in general to the art of earth boring and more particularly to a method of constructing a rotary rock bit having a bearing with alternating surface areas of wear resistant and anti-galling materials.

BACKGROUND OF THE INVENTION

The method of the present invention is especially adaptable for use in producing that type of rotary rock bit popularly known as a three cone bit; however, it is not restricted thereto and the method of the present invention can be used for constructing bearings that can be used in other equipment wherein an improved bearing system is required. In order to obtain high penetration rates with a rotary rock bit in some formations, it is necessary to apply heavy loads on the bit and to operate the bit at a moderate speed. With other formations only moderate loads are required, but the bit must be operated at relatively high speeds.

The rotary rock bit operates under a high corrosive environment and is subjected to temperature extremes. The drilling operation is often conducted thousands of feet underground wherein elevated temperatures are encountered. The bit is continually flushed by circulating drilling fluid to cool the bit and carry away the drill cuttings. This fluid is generally water with chemicals added to control water loss or to control viscosity and/or Ph. These chemicals may produce a corrosive drilling fluid. The drill cuttings, the materials encountered in the earth formations, barites added for fluid weight control, and the chemical composition of the drilling fluid combine to create a corrosive and abrasive drilling environment.

In view of the previously explained circumstances, it can be appreciated that a bearing system for a rotary rock bit must be constructed so that it will include exceptional performance characteristics within a limited geometrical configuration. Since the entire drill string must be withdrawn to replace a bit should it fail, it is highly desirable to have the bearing systems of the bit operate for an extended period of time.

DESCRIPTION OF PRIOR ART

In U.S. Pat. No. 3,984,158 to Robert Sorensen and Anthony Rallis, patented Oct. 5, 1976, journal and pilot bearings with alternating surface areas of wear resistant and anti-galling materials are shown. The journal and/or pilot bearings of a rotary cone earth boring bit are constructed to include alternating areas of wear resistant materials and anti-galling materials. The bearing matrix is formed by compressing a powdered alloy in the shape of the desired bearing element. The bearing matrix is sintered, thereby forming a porous bearing element. An anti-galling material is infiltrated into the porous matrix of the bearing element and the bearing element is hardened. The resulting bearing element includes areas of wear resistant material and areas of anti-galling materials.

In U.S. Pat. No. 2,595,903 to K. H. Swart, patented May 6, 1952, a three cone rock bit is shown. The bit includes three shanks which are assembled together to form the bit. The lower end of each shank is formed into a journal and a generally conical tooth cutter is received over the journal. The bearing system includes friction-type bearings and anti-friction bearings. This patent sets out some of the problems encountered with rotary rock bits.

In U.S. Pat. No. 3,235,316 to J. R. Whanger, patented Feb. 15, 1966, a journal bearing for a rock bit is shown with alternating surface areas of wear-resistant and anti-galling materials. The bearing system disclosed in this patent includes grooves in one of the rotatable members with a soft metal having anti-galling characteristics positioned in the grooves.

SUMMARY OF THE INVENTION

The present invention provides a rolling cone cutter earth boring bit with a bearing surface that has been infiltrated with an anti-galling material to a controlled depth. A groove is machined in a bearing surface of the bearing pin or rolling cone cutter of the bit. The bearing pin or cutter is placed in a die and an alloy powder material is pressed into the recess formed by the groove. The alloy powder material is sintered resulting in a porous matrix bearing element. The porous matrix bearing element is firmly bonded to the base metal of the bearing pin or cutter during the high temperature sintering operation. The porous matrix contains a multiplicity of pores. The voids or pores in the matrix are interconnected and can be filled with an anti-galling material by infiltration. The porous layer of material is infiltrated with an anti-galling material such as silver, lead or plastic materials. This provides a very strong bearing with alternating surface areas of high-strength and anti-galling materials. This bearing surface is backed-up with a base metal which is 100% dense. The opposing bearing surface can be produced from a low-strength and/or less expensive material.

The bearing is a high-strength bearing that will provide performance with high loads at low RPM or high RPM. The foregoing and other features and advantages of the present invention will become apparent from a consideration of the following detailed description of the invention when taken in conjunction with the accompanying drawings.

DETAILED DESCRIPTION OF THE INVENTION

Figure 1:
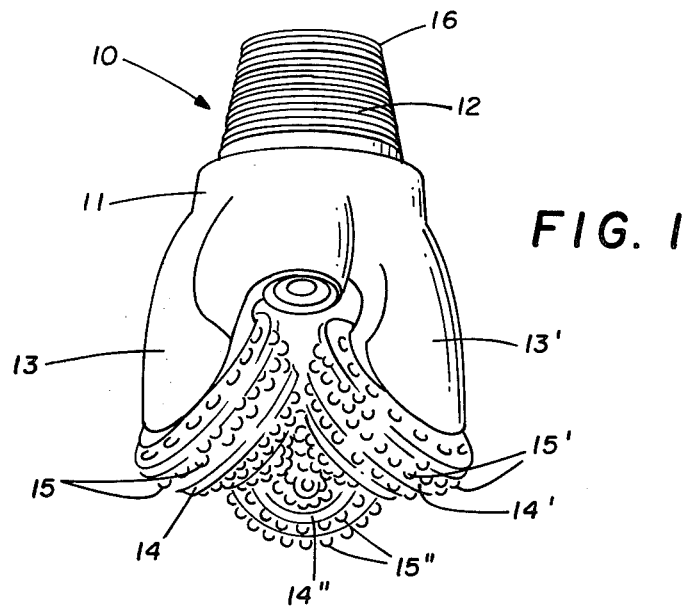
FIG. 1 is a pictorial view of a three cone rotary rock bit.

Referring now to FIG. 1, a three cone jet-type rotary rock bit generally designated by the reference number 10 is illustrated. The bit 10 includes a bit body 11 including an upper threaded portion 12. The threaded portion 12 allows the bit 10 to be connected to the lower end of a rotary drill string (not shown). Depending from the bit body 11 are three substantially identical arms with two of the arms 13 and 13' being shown in FIG. 1. Three rotary cone cutters 14, 14' and 14" are rotatably positioned on three bearing pins extending from the three arms. Each of the cutters 14, 14' and 14" includes cutting structure 15, 15' and 15", respectively on its outer surface adapted to disintegrate the formations as the bit 10 is rotated and moved through the formations. The cutting structure 15, 15' and 15" is shown in the form of tungsten carbide inserts; however, it is to be understood that other cutting structures such as steel teeth may be used as a cutting structure on the cone cutters.

The bit 10 includes a central passageway 16 extending along the central axis of body 11 to allow drilling fluid to enter from the upper section of the drill string, (not shown) immediately above and pass downward through three jet nozzles, one nozzle being shown in FIG. 1, to the bottom of the well bore. In use, the bit 10 is connected as the lower member of a rotary drill string (not shown) and lowered into the well bore until the cone cutters 14, 14' and 14" engage the bottom of the well bore. Upon engagement with the bottom of the well bore, the drill string is rotated, rotating bit 10 therewith. The cutters 14, 14' and 14" rotate on their respective bearing pins. Drilling fluid is forced downward through the interior passage of the rotary drill string and the drilling fluid continues through the central passageway 16 of the bit 10 passing through the nozzles to the bottom of the well bore, thence upward in the annulus between the drill string and the wall of the well bore to the earth's surface.

Figure 2:
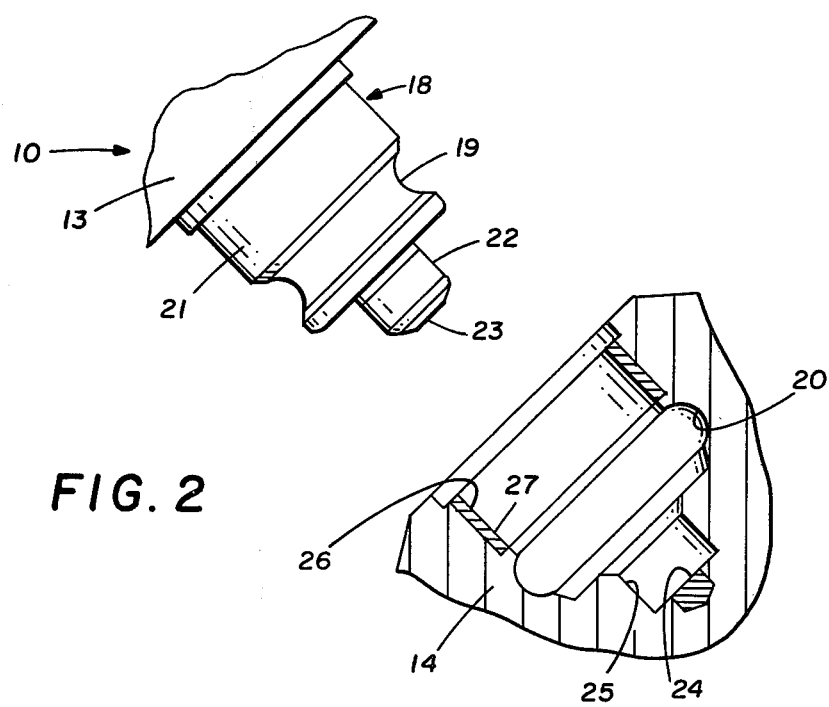
FIG. 2 shows an enlarged view of one of the bearing pins and a sectional view of the associated rolling cone cutter of the bit shown in FIG. 1.

Referring now to FIG. 2, a portion of the arm 13 of bit 10 is shown with the bearing pin 18 extending therefrom. A cut-away sectional view of the cone cutter 14 is shown with cutter 14 removed from the bearing pin 18. In operation, the cutter 14 will be rotatably mounted upon the bearing pin 18 and locked thereon by ball bearings that extend between the ball bearing raceway 19 on the bearing pin and the ball bearing raceway 20 in the cone cutter 14. The bearing pin 18 includes an outer friction or journal bearing 21, an inner friction or journal bearing 22 and a thrust button 23 in addition to the ball bearing system. The cone cutter 14 includes a nose bushing 24 that mates with the thrust button 23 on the bearing pin and an inner bearing surface 25 that mates with the inner bearing surface 22 on the bearing pin.

A groove 26 is provided on the internal surface of the cone cutter 14 that will oppose the bearing surface 21 on the bearing pin 18. In forming the groove 26, the inner surface of the cutter 14 is undercut by 0.047 to 0.062 inch. This undercut is filled with a bearing material 27 providing a bearing surface with alternate areas of wear resistant and anti-galling materials.

The bearing system for the rotary rock bit 10 must be constructed so that it will include exceptional performance characteristics within a limited geometrical configuration. The body of rolling cone cutter 14 is machined from a forging of 4820 or 9315 steel. The outer bearing surface area is undercut by 0.047 to 0.062 inch. The machined cutter forging is placed in a die. A powder material such as 4820 or 9315 alloy powder is pressed into the recess 26 formed by the undercut. Graphite or carbon is mixed with the alloy powder prior to pressing to obtain the desired final carbon content. For example, sufficient graphite is added to the alloy powder to provide the porous matrix with a 0.4% carbon content after the pressed matrix is sintered. A die lubricant is generally added to the alloy powder prior to pressing to lubricate the die and increase the grain strength of the matrix. The lubricant die may, for example, be zinc stearate. The die lubricant burns off during sintering. The alloy powder is then pressed to provide a porous matrix with a density of 80% to 90% after sintering.

The forging is sintered at 2050° F. for 40 minutes. The graphite mixed with the alloy powder diffuses into the structure during the sintering and combines with the steel to produce a homogeneous structure with the desired carbon content. The fusion of the carbon through the structure as well as the fusion bonding of the particles together requires temperatures above 1800° F. The diffusion process may take several hours at 1800° F. while taking less than 1 hour at temperatures above 2000° F. The porous matrix becomes bonded to the base metal of the cutter forging during the high temperature sintering operation. The porous matrix contains a multiplicity of pores that are interconnected and can be filled with an anti-galling material by infiltration.

The porous layer of material 27 is infiltrated with an anti-galling material such as silver, lead or plastic materials. This provides a very strong matrix yet allows infiltration of the porous surface with an anti-galling material. The porous matrix is infiltrated with 85% silver, 15% manganese alloy at a temperature of 2050° F. for 40 minutes. The silver and manganese alloy is placed on the porous matrix and heat is applied to allow capillary action and gravity to draw the silver and manganese alloy into and fill the pores. It is understood that other anti-galling materials may be used as the infiltrating material. In general, the infiltrating material can be a metal or alloy having softness and anti-galling nature on the order of silver, silver alloys or babbitt metals. After the porous matrix has been infiltrated with silver, the matrix is hardened. The hardening may be accomplished by through hardening or case hardening. The porous matrix of the preferred embodiment is case hardened by pack carburizing at 1700° F. for 12 hours, heating to 1470° F. for 1½ hours and quenching in an oil bath. The internal surface of the bearing element 27 is machined to provide the desired bearing surface.

The present invention provides a bearing surface that contains alternating surface areas of high-strength and anti-galling materials. This bearing surface is backed-up with a low-cost base metal which is 100% dense. The total amount of anti-galling material is small compared to prior art bearings of this general nature. The present invention provides a high-strength bearing with the base consisting of a high-strength material. The bearing is provided at a reasonable cost. The opposing bearing surface can be produced from a low-strength and/or less expensive material. The present invention provides a bearing surface that is infiltrated with an anti-galling material to a controlled depth. The bearing element is intimately joined to the base metal.

The embodiments of the invention in which an exclusive property or privilege is claimed are defined as follows:

1. A method of manufacturing an earth boring bit having a cantilevered bearing pin and a rolling cutter to be rotatably mounted upon said bearing pin, said bearing pin and rolling cutter having opposed bearing members, comprising the steps of:
   producing an annular recess in said bearing member of said rolling cutter;
   placing said rolling cutter and bearing member in a die; pressing an alloy powder into said recess thereby producing a porous matrix element;
   sintering said porous matrix element to form a porous matrix bearing element that is firmly bonded to said rolling cutter;
   infiltrating an anti-galling material into said porous matrix bearing element that is firmly bonded to said rolling cutter;
   hardening said porous matrix bearing element; and machining said porous matrix bearing element to provide the desired bearing surface on said rolling cutter.

2. A method of manufacturing a rotary rock bit having a bearing pin and a rolling cone cutter mounted upon said bearing pin, said bearing pin and rolling cone cutter having opposed bearing members, comprising the steps of:

producing an annular recess in said bearing member of said rolling cone cutter;

pressing an alloy powder into said recess thereby producing a porous matrix element;

sintering said porous matrix element to form a porous matrix bearing element that is firmly bonded to said rolling cone cutter; and infiltrating an anti-galling material into said porous matrix bearing element that is bonded to said rolling cone cutter.

3. A method of manufacturing a rolling cone cutter earth boring bit having a bearing shaft and a rolling cone cutter mounted upon said bearing shaft, said bearing shaft and rolling cone cutter having opposed bearing members, comprising the steps of:

producing an annular groove in said bearing member of said rolling cone cutter;

pressing an alloy powder into said groove thereby producing a porous matrix element;

sintering said porous matrix element to form a porous matrix bearing element that is firmly bonded to said rolling cone cutter;

infiltrating an anti-galling material into said porous matrix bearing element; and hardening said porous matrix bearing element.

4. A method of manufacturing a rotary rock bit having a bearing pin and a rolling cone cutter adapted to be mounted upon said bearing pin, said bearing pin having an exterior bearing surface and said rolling cutter having an opposed bearing member, comprising the steps of:

producing a groove in said rolling cone cutter for said bearing member;

pressing an alloy powder into said groove thereby producing a porous matrix element;

sintering said porous matrix element to form a porous matrix bearing element that is firmly bonded to said rolling cone cutter;

infiltrating an anti-galling material into said porous matrix bearing element;

hardening said porous matrix bearing element;

machining said porous matrix bearing element to form said bearing member; and mounting said rolling cone cutter on said bearing pin.

* * * * *